US012790497B2

(12) United States Patent
Dodds

(10) Patent No.: US 12,790,497 B2
(45) Date of Patent: Nov. 10, 2026

(54) CORROSION INHIBITOR

(71) Applicant: Hexigone Inhibitors Limited, Port Talbot West Glamorgan (GB)

(72) Inventor: Patrick Dodds, Port Talbot West Glamorgan (GB)

(73) Assignee: Hexigone Inhibitors Limited, Port Talbot West Glamorgan (GB)

( * ) Notice: Subject to any disclaimer, the term of this patent is extended or adjusted under 35 U.S.C. 154(b) by 1009 days.

(21) Appl. No.: 17/776,088

(22) PCT Filed: Nov. 16, 2020

(86) PCT No.: PCT/GB2020/052913

§ 371 (c)(1),
(2) Date: May 11, 2022

(87) PCT Pub. No.: WO2021/094785

PCT Pub. Date: May 20, 2021

(65) Prior Publication Data

US 2022/0389235 A1 Dec. 8, 2022

(30) Foreign Application Priority Data

Nov. 14, 2019 (GB) ..................................... 1916563

(51) Int. Cl.
*C09D 5/08* (2006.01)
*B05D 7/14* (2006.01)

(52) U.S. Cl.
CPC ............... *C09D 5/084* (2013.01); *B05D 7/14* (2013.01); *C09D 5/082* (2013.01); *C09D 5/086* (2013.01)

(58) Field of Classification Search
None
See application file for complete search history.

(56) References Cited

U.S. PATENT DOCUMENTS

| | | | |
|---|---|---|---|
| 3,899,624 | A | 8/1975 | Sutherland |
| 4,612,049 | A | 9/1986 | Berner et al. |
| 4,643,769 | A | 2/1987 | Othen |
| 4,775,588 | A | 10/1988 | Ishii et al. |
| 5,132,093 | A | 7/1992 | Hettiarachchi et al. |
| 5,266,230 | A | 11/1993 | Tomizawa et al. |

(Continued)

FOREIGN PATENT DOCUMENTS

| | | | |
|---|---|---|---|
| CN | 102140642 | A | 8/2011 |
| CN | 102391743 | A | 3/2012 |

(Continued)

OTHER PUBLICATIONS

Office Action in Corresponding Japanese Application No. 2022-527959 Mailed Nov. 12, 2024, 6 pages.

(Continued)

*Primary Examiner* — Joseph D Anthony
(74) *Attorney, Agent, or Firm* — Dinsmore & Shohl LLP

(57) ABSTRACT

A corrosion inhibiting additive and a corrosion inhibiting coating including the additive for providing corrosion resistance to a metal are provided. The corrosion inhibiting additive includes a first corrosion inhibiter comprising an organic cation in a cation exchange resin and a second corrosion inhibiter includes a phosphate compound. The corrosion inhibiting additive is for incorporation into a coating having at least a polymer binder.

12 Claims, 16 Drawing Sheets

(56) References Cited

U.S. PATENT DOCUMENTS

| | | | | |
|---|---|---|---|---|
| 7,578,878 | B2 | 8/2009 | Sinko et al. | |
| 11,352,702 | B2 * | 6/2022 | Dodds | C23F 11/173 |
| 2004/0086757 | A1 | 5/2004 | Mohapatra | |
| 2004/0249023 | A1 * | 12/2004 | Stoffer | C09C 1/56 524/48 |
| 2006/0049167 | A1 | 3/2006 | Yang et al. | |
| 2006/0063872 | A1 * | 3/2006 | Teachout | C09D 5/082 524/428 |
| 2007/0075120 | A1 | 4/2007 | Yang et al. | |
| 2012/0085261 | A1 | 4/2012 | Barbe et al. | |
| 2012/0270129 | A1 | 10/2012 | Marinho et al. | |
| 2012/0288404 | A1 | 11/2012 | Yang et al. | |
| 2018/0312981 | A1 * | 11/2018 | Dodds | C23F 11/00 |
| 2020/0165466 | A1 * | 5/2020 | Dodds | C09D 5/086 |

FOREIGN PATENT DOCUMENTS

| | | | |
|---|---|---|---|
| CN | 105349000 | A | 2/2016 |
| CN | 106009273 | A | 10/2016 |
| CN | 106117783 | A | 11/2016 |
| EP | 0170356 | A1 | 2/1986 |
| EP | 0349893 | A1 | 1/1990 |
| EP | 1382721 | A1 | 1/2004 |
| EP | 2368945 | A2 | 9/2011 |
| GB | 2081275 | A | 2/1982 |
| GB | 2527640 | A | 12/2015 |
| JP | H3215574 | A | 9/1991 |
| JP | H11279452 | A | 10/1999 |
| JP | 2007217732 | A | 8/2007 |
| JP | 2008000910 | A | 1/2008 |
| JP | 2008546910 | A | 12/2008 |
| JP | 2018197869 | A | 8/2019 |
| JP | 2020517831 | A | 8/2022 |
| KR | 20160011874 | A | 2/2016 |
| WO | 03102034 | A1 | 12/2003 |
| WO | 2005003408 | A2 | 1/2005 |
| WO | 2005071021 | A1 | 8/2005 |
| WO | 2006061230 | A1 | 6/2006 |
| WO | 2007002558 | A1 | 1/2007 |
| WO | 2010010052 | A1 | 1/2010 |
| WO | 2012089649 | A1 | 7/2012 |
| WO | 2017064499 | A1 | 4/2017 |
| WO | 2018197869 | A1 | 11/2018 |

OTHER PUBLICATIONS

International Search Report dated Feb. 12, 2021; International Application No. PCT/GB2020/052913.

United Kingdom Search Report dated Jan. 30, 2020; International Application No. GB1916563.8.

Zheludkevich M L et al: “Smart coatings for active corrosion protection based on multi-functional micro and nanocontainers” Electrochimica Acta. vol. 82. May 3, 2012 (May 3, 2012). pp. 314-323.

Williams Get al: “Smart release corrosion inhibitor pigments based on organic ion-exchange resins” Corrosion Science. Oxford. GB. vol. 57. Dec. 26, 2011 (Dec. 26, 2011). pp. 139-147.

Kamaraj, K. et al. “Corrosion Protection of Iron Benzoate Doped Polyaniline Containing Coatings” Progress in Organic Coatings 64, 2009, pp. 460-465.

Amberlite IRA402 CI Product Data Sheet, 2008 Rohm and Haas Company.

Barahuie, F. et al. “Development of Drug Delivery Systems Based on Layered Hydroxides for Nanomedicine” International Journal of Molecular Sciences 2014, 15, 7750-7786.

Wikipedia article entitled “Hydrotalcite” retrieved from URL https://en.wikipedia.org/w/index.php?title=Hydrotalcite&oldid=639596367.

Mishra T. et al. “Recent Development in Clay Based Functional Coating for Corrosion Protection” Key Engineering Materials vol. 571 (2013), pp. 93-109.

Third Party Observation for Application No. EP20160784256; date of submission: Oct. 13, 2019.

Third Party Observation for Application No. EP20160784256; date of submission: Dec. 5, 2019.

Dowex Technical Information Bulletin, dated Sep. 27, 2019; 3 pages.

Amberlite Technical Information Bulletin; dated Sep. 27, 2019; 4 pages.

* cited by examiner (e)

(f)

(g)

(a)

(b)

(a)

(b)

(a)

(b)

(a)

(b)

(a)

(c)

(a) (b) (c)

(a) (b) (c)

CORROSION INHIBITOR

CROSS-REFERENCE TO RELATED APPLICATIONS

This application is the U.S. National Stage of PCT/GB2020/052913 filed on Nov. 16, 2020, which claims priority to United Kingdom Patent Application 1916563.8 filed on Nov. 14, 2019, the entire content of both are incorporated herein by reference in their entirety.

FIELD OF THE INVENTION

The present invention relates to a corrosion inhibiting additive and a corrosion inhibiting coating provided for coating a metal, particularly a ferrous metal. The corrosion inhibiting additive will also protect aluminium, magnesium and zinc, and their alloys, which includes galvanised steel, and therefore in that instance improving corrosion resistance to the underlying steel.

BACKGROUND OF THE INVENTION

Corrosion inhibitors, sometimes referred to as corrosion inhibitive pigments, currently exist in the form of sparingly soluble inorganic salt powders, dispersed within an organic coating have been traditionally used to protect a wide range of metallic surfaces, including steel and galvanised steel. A typical steel coating system is shown in FIG. 1 and comprises a steel substrate 2, a metallic coating 4 (to sacrificially protect the steel substrate, typically comprising zinc or a zinc alloy), a conversion coating 6 (to provide improved adhesion between the metallic coating and organic coating, as well as to provide corrosion inhibition), a primer 8 and a barrier 10 (typically comprising a polymeric coating). The primer can comprise a polymer only, polymer and solvent, polymer and water, 100% solids or powder, mixed with a corrosion inhibitor such as zinc or strontium chromate. In the event of rupture of the barrier materials as shown in FIG. 2, inhibitive species derived from the zinc or strontium chromate leach out of the primer 2 and form a precipitate or protective layer around the point of rupture, thus protecting the underlying steel substrate 2. This is represented in FIG. 2.

Traditional anti-corrosion inhibitors comprise sparingly soluble chromium salts such as zinc or strontium chromate, which have a degree of toxicity which is not environmentally acceptable. Alternative, environmentally more acceptable (Cr (vi)-free) inhibitive pigments, typically based on sparingly soluble phosphate salt technologies are available, however they are invariably less effective than their chromate counterparts. This is at least partially as a result of low solubility of phosphate salts. Accordingly, in a corrosive environment significant time must have passed before there are sufficient concentrations of phosphate anions to react with the metal cations leading to a time delay where corrosion can proceed unimpeded. This has been addressed to a limited degree through modification of the phosphate salt to increase solubility in combination with high dosing of phosphate salts into a coating, where 30 weight percent of the total weight of the liquid coating is typical. An additional problem with phosphate salts is progressive leaching out over time, leading to a loss of coating barrier protection. This also has a negative environmental impact due to the quantities of inhibitive species required in the coating in order to protect the underlying substrate for a reasonable period of time.

On demand corrosion inhibitors are also known and an example is shown in WO2018/1978659, the corrosion inhibitive species are stored within the coating until such point as they are required (i.e. so-called “on-demand” release). An on-demand corrosion inhibitor may comprise an organic cation such as benzotriazolate, which is provided in a cation exchange resin such as a styrene/divinylbenzene copolymer with a negatively charged group, such as a sulphonated group. When an electrolyte is present (comprising cations and anions) in a corrosive environment cations are sequestered by the cation exchange resin which releases benzotrialozate (protonated benzotriazole) into the electrolyte where it is deprotonated and will then turn into its anionic form. The azole group at one end forms a bond with the metallic surface and also metallic ions released the anodic dissolution. A precipitate is then formed by reaction of benzotriazole anions with metal cations to form an inhibitive film which blocks the surface to further corrosive attack.

The present invention seeks to provide an alternative corrosion inhibitor for protecting metals that is highly effective in preventing corrosion and is also cost effective.

SUMMARY OF THE INVENTION

According to an aspect of the present invention there is a corrosion inhibiting additive comprising:

- a first corrosion inhibitor comprising an organic cation in a cation exchange resin, and;
- a second corrosion inhibitor comprising a phosphate compound.

It has been determined that there is an unexpected synergistic effect between the action of the first and second corrosion inhibitor. The incorporation of a first corrosion inhibitor which is a smart corrosion inhibitor and only releases ions in the event of a corrosive environment and a second corrosion inhibitor which is not a smart corrosion inhibitor and releases phosphate ions into solution under normal aqueous conditions provides corrosion inhibition and provides a significantly beneficial outcome. It has been determined that under conditions of corrosion resulting from puncturing of a coating on a metal for example, the first corrosion inhibitor immediately responds to form a precipitate with the metal cations released. This response is very fast, minimising the corrosion progression. However, under these conditions of aqueous environment, phosphate anions dissolve out of the phosphate salt, which then react with remaining metal cations to form a precipitate of metal phosphate. The combined precipitate formed from the first and second corrosion inhibitors provides a strong protective layer to prevent further corrosion.

Contrary to expected teaching, the addition of a second corrosion inhibitor in the form of a phosphate compound to a first corrosion inhibitor comprising a smart corrosion inhibitor in the form of an organic cation in a cation exchange resin would not be expected to provide beneficial performance compared to the first corrosion inhibitor in isolation. The expectation would be that the combination of a lesser performing inhibitor comprising a phosphate compound would have a detrimental or at least have no effect upon the first corrosion inhibitor however this has been found to not be the case and instead there is a synergistic effect. In addition, the effect of the provision of the first corrosion inhibitor upon the second corrosion inhibitor is that the rate of leaching of the second corrosion inhibitor from a coating is reduced.

The first and second corrosion inhibitors preferably comprise or may each be individually termed corrosion inhibiting pigments.

The corrosion inhibiting additive is particularly beneficial in protecting ferrous metals (for example mild steel), and non-ferrous materials such as aluminium and the galvanising coating of metals such as galvanised steel.

The phosphate compound is a compound which releases phosphate anions into solution. Accordingly, in an aqueous environment phosphate anions are released. These phosphate anions react with metal cations present in a corrosive environment to form a solid precipitate. The phosphate compound may comprise a phosphate and/or polyphosphate and/or phosphosilicate. Examples of suitable phosphate compounds may be one or more metal phosphates such as zinc phosphate which is the most commercially common corrosion inhibiting pigment. The phosphate compound may comprise a polyphosphate compound such as strontium, calcium, magnesium or aluminium polyphosphate. A benefit of utilising a polyphosphate compound is an increased rate of dissolving compared to for example a metal phosphate. Other suitable phosphate compounds are for example phosphosilicates such as calcium strontium phosphosilicate. The phosphate compound may comprise a mixture of a plurality of different phosphate compounds.

The expectation of adding the additive comprising the first and second corrosion inhibitor to a coating is that as the phosphate is difficult to dissolve, it would have either no effect as the first corrosion inhibitor would have taken care of the corrosive ions through release of the organic cation or detrimental effect by in some way affecting this process. However, a significant performance benefit has been shown with a second corrosion inhibitor of a phosphate-based system. Phosphate-based inhibitors are known to form a protective layer; however this is usually so slow due to the low solubility that by the time ions are in solution to form a precipitate corrosion is well underway. Fast release of the organic cation however provides an immediate response to corrosion, interfering with anodic and cathodic sites. However, phosphate cations are still gradually released at the corrosion sites, although much slower than the organic cations from the first corrosion inhibitor, and have then been found to effectively form onto the anodic sites and onto the already formed precipitate meaning that a much more stable and long term protective precipitate is formed than solely produced than by the first corrosion inhibitor alone.

The first and second corrosion inhibitor are beneficially particulate. This enables dispersion within a coating to provide corrosion protection to a substrate. The first and second corrosion inhibitor may be provided as a mixture or may be provided in a non-combined state with appropriate mixing instructions for a user. In either form however the first and second corrosion inhibitor are not chemically combined. The mixture preferably comprises a range of usable weight ratios of first corrosion inhibitor to second corrosion inhibitor of 2:15 and 15:2 respectively. The mixture may comprise a range of usable weight ratios of first to second corrosion inhibitor of 1:5 and 5:1 respectively. Even more preferably the mixture comprises a range of usable weight ratios of first to second corrosion inhibitor of 1:4 and 4:1, and 1:3 and 3:1 respectively.

The first and second corrosion inhibitor may be combined with a polymer binder to form a coating for application to a substrate.

The coating may be applied to a metal substrate as part of a coating system, such that other materials or additives may be provided in the coating, and/or additional coating layers may be applied to the substrate. The coating may be termed a primer or direct to metal coating or powder coating. The solid, preferably particulate first and second corrosion inhibitors incorporated into or with the polymer binder, form an organic paint, coating or primer. This paint or coating can then be used to coat a substrate, such as a metal object e.g. a sheet. The first and second corrosion inhibitor are dispersed through the coating.

Also according to the present invention there is provided a coating for a metal substrate comprising a first corrosion inhibitor comprising an organic cation in a cation exchange resin, and a second corrosion inhibitor comprising a phosphate compound, wherein the first and second corrosion inhibitors are provided in a polymer binder.

The range of usable weight ratios of first corrosion inhibitor to second corrosion inhibitor preferably comprises between 2:15 and 15:2 respectively, preferably between 1:5 and 5:1, and even more preferably between 1:4 and 4:1.

The coating may comprise weight ratios of between 2 and 25 weight percent of the first corrosion inhibitor of the coating in wet form, and between 2 and 25 weight percent of the second corrosion inhibitor of the coating in wet form, where the total weight percent of the combined first and second corrosion inhibitor in the coating does not exceed substantially 30%. Accordingly, the combined first and second corrosion inhibitor together may comprise between 4 and 30% weight percent of the total coating weight in wet form, more preferably between 5 and 20%. Such quantities are often represented in Pigment Volume Concentration (PVC) of the dried coating, and typically comprise in the total range of 4-30 PVC. Illustrative embodiments are presented of various weights of first and second corrosion inhibitors relative to the total weight of the coating. This is in comparison with current use soluble phosphate salt technologies as corrosion inhibiting pigments, where around 30 weight percent of the coating in wet form is made up of a soluble phosphate salt, meaning the phosphate loading is significantly reduced.

The polymer binder of the coating acts to carry the individual first and second corrosion inhibitors and bind it within the polymer. The polymer is beneficially liquid at room temperature and pressure; however this is not essential and can be provided in solid particulate form for powder coating the substrate. In this embodiment, the polymer is also preferably provided as a particulate with the first and second corrosion inhibitor also in particulate form dispersed therethrough. The first and second corrosion inhibitors are beneficially solid at room temperature and pressure and are dispersed through the polymer binder. The polymer binder may be selected from one or more of an acrylic, epoxy, polyurethane, polyester, alkyd, silicone or polyvinyl butyral.

Organic cations are any cations that fit the general definition of an organic compound, which comprise at least carbon and hydrogen atoms. An organic cation in a cation exchange resin provides a first corrosion inhibitor having the beneficial properties of acting as a smart release corrosion inhibitor with improved capability for providing corrosion resistance whilst also being environmentally acceptable. Such a corrosion inhibitor is capable of allowing dissociation of the organic cation from the cation exchange resin under the conditions of a corrosive electrolyte becoming present, and sequesters ions (preferably benzotriazole) in a protonated form to form a precipitate or barrier layer by deprotonation to prevent further corrosion.

The organic cation is preferably an azole, oxime or hydrophobic amino acid where an azole is characterised as any of numerous compounds characterised by a five membered ring containing at least one nitrogen atom. The organic cation is preferably benzotriazole or derivatives thereof, such as 5 methyl benzotriazole and others. Benzotriazole is a solid provided as a powder at room temperature and pressure, and protonation of benzotriazole provides positively charged benzotriazole which is then attracted to the cation exchange resin to provide a corrosion inhibitor. An organic cation comprising a benzene ring, particularly benzotriazole has been found to be beneficial.

The cation exchange resin, sometimes referred to as a cation exchange polymer, is an insoluble matrix preferably formed of a plurality of particles, often referred to as beads. These beads may have a diameter of 0.2-3.0 mm diameter. The ion exchange resin provides ion exchange sites.

The cation exchange resin is preferably an organic cation exchange resin. The organic cation exchange resin may be styrene/divinylbenzene copolymer with a negatively charged group, such as a sulphonated group. It has been found beneficial that the organic cation exchange resin is an organic cation exchange resin which attracts the organic cation to provide the corrosion inhibitor. It is preferred that the divinylbenzene is a styrene divinylbenzene copolymer having a sulphonated functional group.

The irregular particulate size of the first and preferably the second corrosion inhibitor is preferably less than 100 microns, even more preferably less than 50 microns, preferably less than 20 microns, and preferably less than 5 microns depending on the coating application.

Also according to the present invention there is a method of manufacturing a corrosion inhibiting coating comprising combining:

- a first corrosion inhibitor comprising an organic cation in a cation exchange resin;
- a second corrosion inhibitor comprising a phosphate compound; and
- a polymer binder.

The combination of first and second corrosion inhibitor and polymer binder is preferably mixed. The polymer binder may be in liquid form upon combining with the first and second corrosion inhibitors. The first and second corrosion inhibitors are preferably each in the form of respective irregularly formed particles, and at the disclosed size range are in the form of a powder.

Also according to the present invention there is a method of protecting a metal substrate comprising applying a corrosion inhibiting coating to the substrate, the corrosion inhibiting coating comprising:

- a first corrosion inhibitor comprising an organic cation in a cation exchange resin
- a second corrosion inhibitor comprising a phosphate compound; and
- a polymer binder.

The corrosion inhibiting coating is preferably applied directly to the metal substrate or the metal substrate that has undergone a pre-treatment. The coating may be applied to the substrate in either solid (particulate) form when applied utilising powder coating technology, or else in a form whereby the polymer binder is in liquid form at room temperature and pressure. The corrosion inhibiting coating may be termed a primer.

BRIEF DESCRIPTION OF THE DRAWINGS

An embodiment of the invention will now be described by way of example only with reference to and as illustrated in the following figures and examples in which.

DETAILED DESCRIPTION OF AN EMBODIMENT OF THE INVENTION

Figure 1:
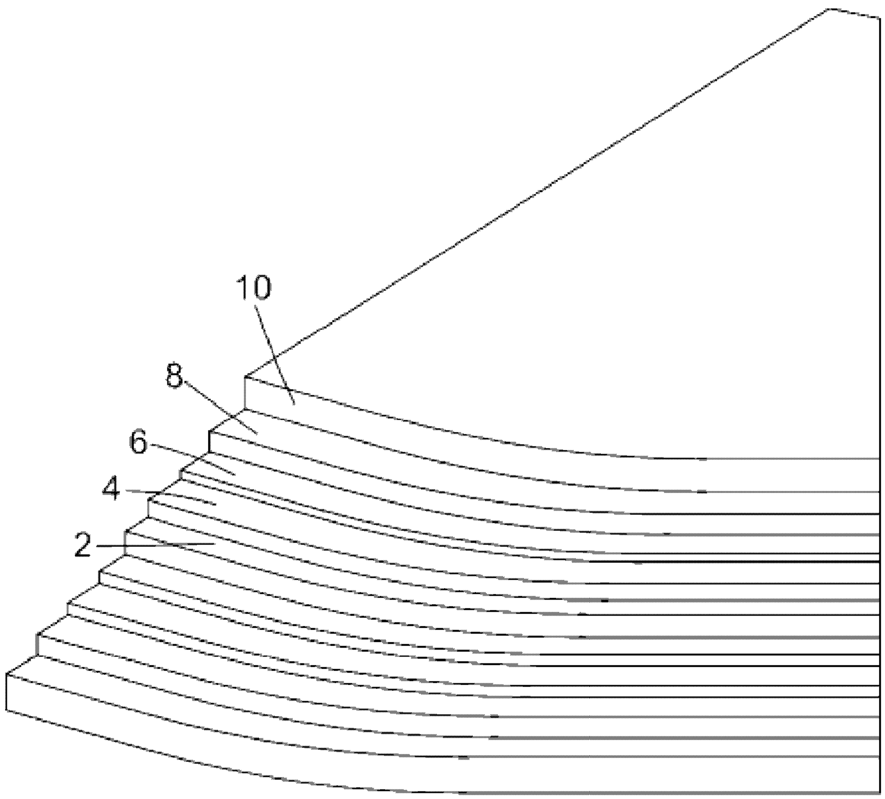
FIG. 1 shows: a schematic exploded view of a typical metal substrate and coating layers.
Figure 2:
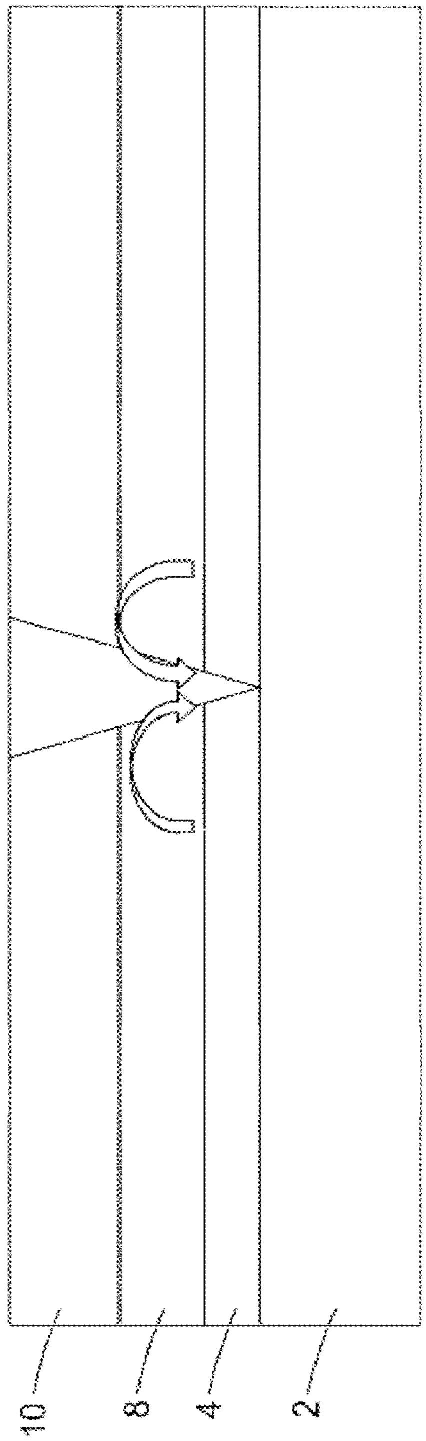
FIG. 2 shows: the action of a corrosion inhibitor in the event of a breach of coating layers to reach the metal substrate.

The present invention has been developed to provide an alternative corrosion inhibitor.

Referring to FIG. 3, there is a metal substrate 2 on top of which is a primer 8 with first and second corrosion inhibitors 30, 32 dispersed therethrough. The primer is then coated with a barrier coating 10. The first corrosion inhibitor 30 comprises an organic cation in a cation exchange resin, provided in particulate form. As an example only, the organic cation is benzotriazole or a derivative thereof, and the cation exchange resin is styrene and/or divinylbenzene copolymer with a negatively charged sulphonated functional group. The second corrosion inhibitor 32 comprises a phosphate compound such as zinc phosphate, strontium polyphosphate, or calcium strontium phosphosilicate as examples only also provided in particulate form. The first and second corrosion inhibitors are combined with a polymer binder in desired quantities for the application thereby providing a coating for a metal, and applied to the metal substrate 2 in liquid form and allowed to dry before application of the barrier coating 10.

It will be appreciated that the first and second corrosion inhibitors 30,32 may either be combined then added to a polymer binder or added independently. Either way, the particulate corrosion inhibitors are dispersed through the coating.

The coating comprises between 2 and 15 weight percent of the first corrosion inhibitor of the coating in wet form, and between 2 and 15 weight percent of the second corrosion inhibitor of the coating in wet form. Even more preferably, the coating may comprise between 2 and 10 weight percent of the first corrosion inhibitor of the coating in wet form, and between 2 and 10 weight percent of the second corrosion inhibitor of the coating in wet form. It has been determined that there is a beneficial corrosion resistance effect across such a range of weight percentages, and a reduction in the relative weight percent of the second corrosion inhibitor can be achieved as the first corrosion inhibitor reduces the rate of leaching out of the second corrosion inhibitor. The first and second corrosion inhibitor also preferably comprises a range of usable ratios of first corrosion inhibitor to second corrosion inhibitor of 1:5 and 5:1 respectively.

Figure 3A:
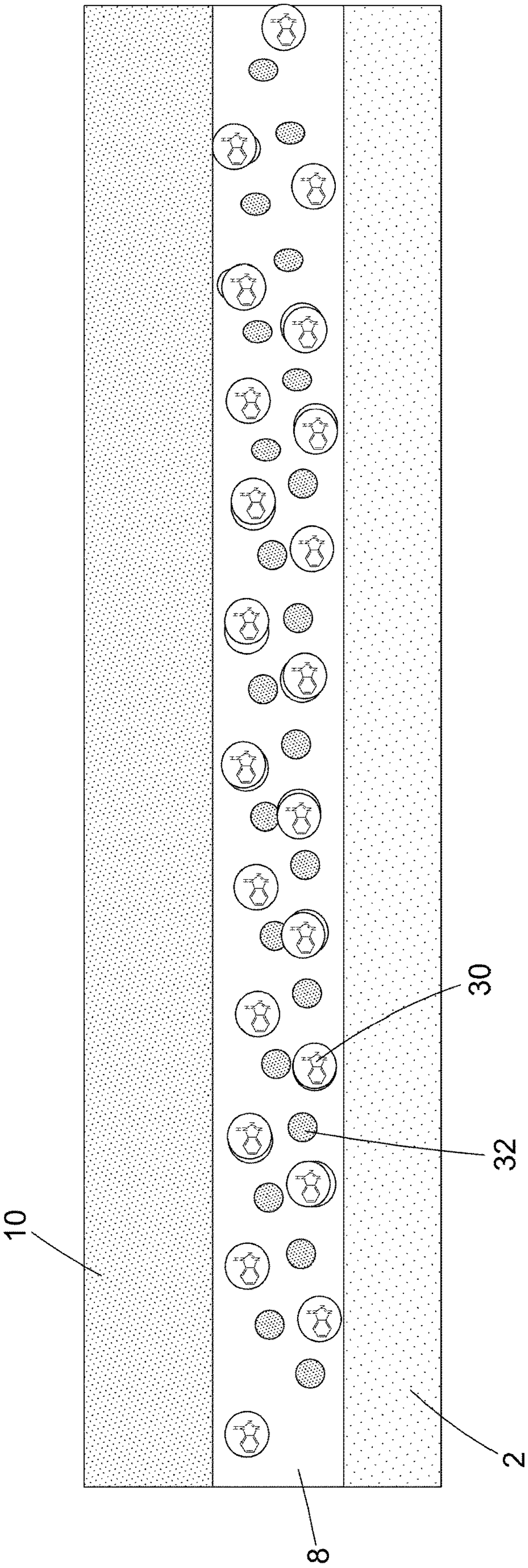
FIG. 3*a-d* are schematic representations of the stages of protection of a substrate with FIG. 3*e* showing a magnified view.
Figure 3B:
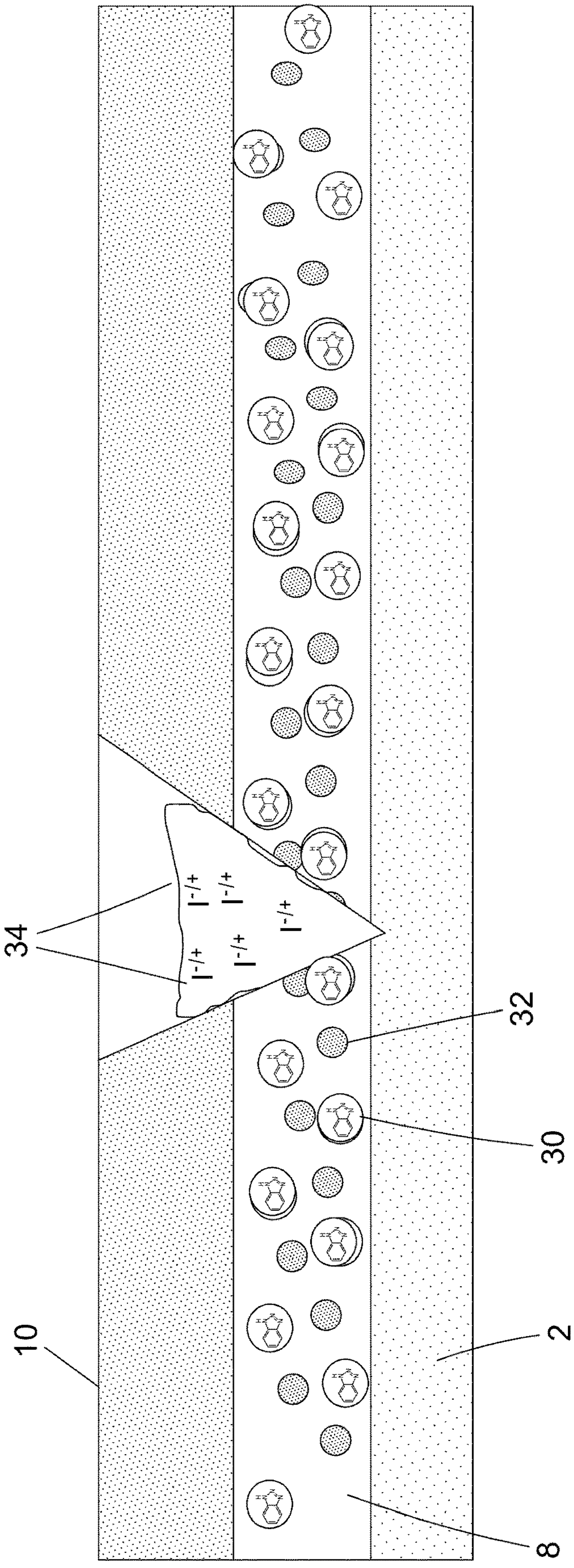
Figure 3C:
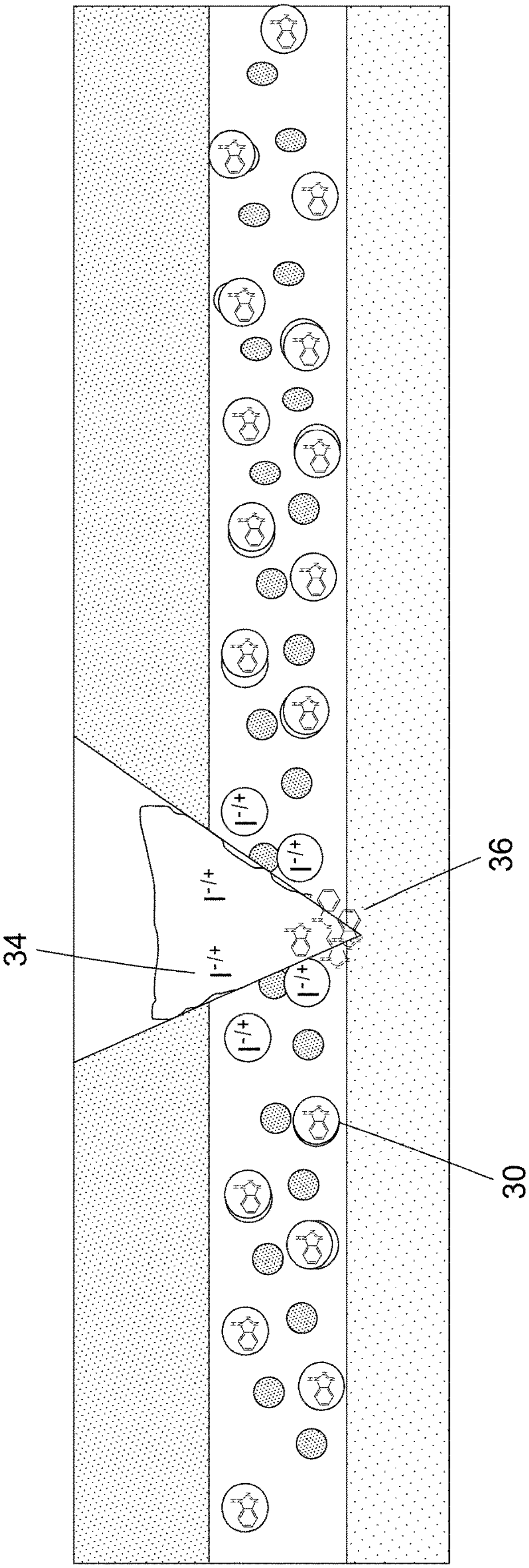
Figure 3D:
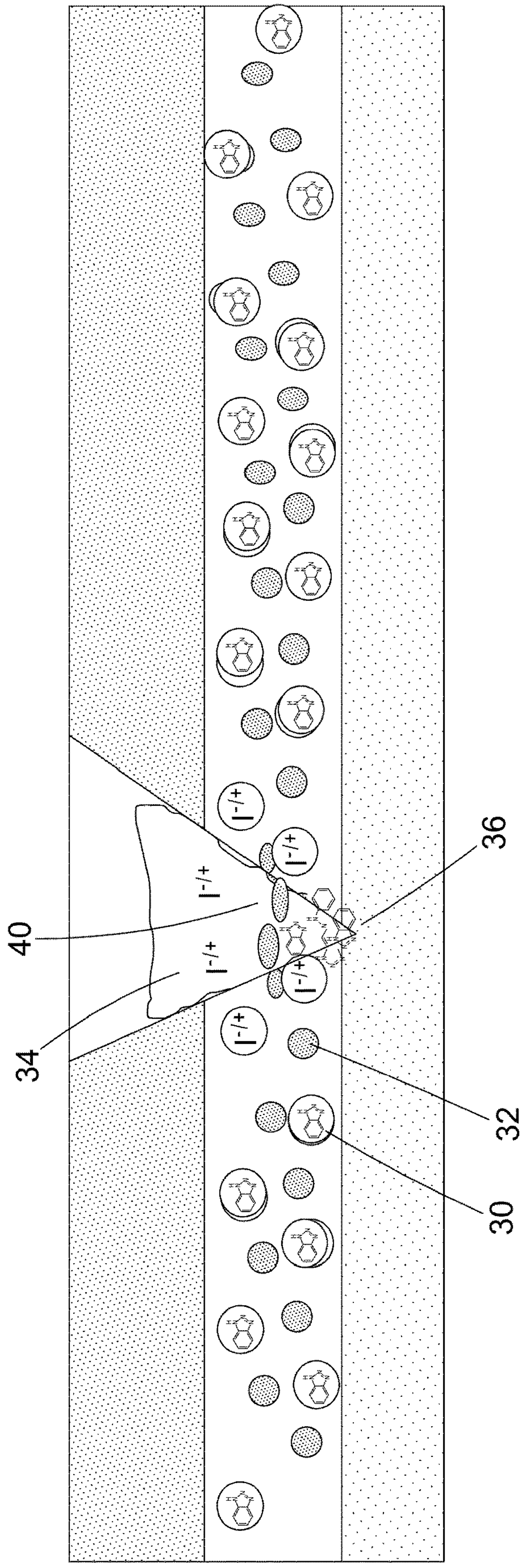
Figure 3E:
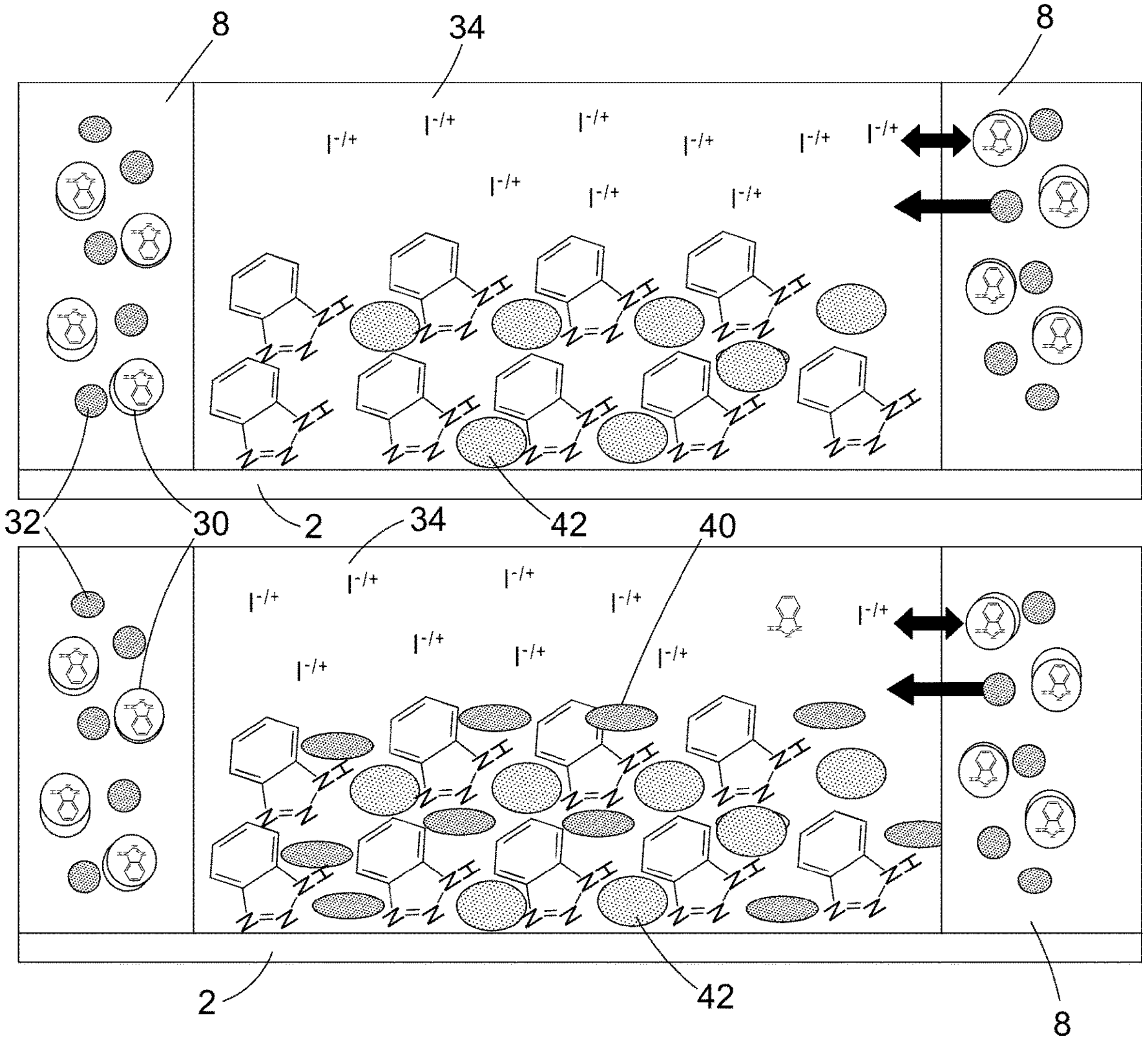

The steps of protection of a metal substrate 2 will now be described under conditions of a corrosive environment due to breach of the protective coatings of the substrate. Referring to FIG. 3*b*, the barrier coating 10 and the primer 8 have been breached. Corrosive ions 34 are therefore capable of communicating with the substrate 2 thereby effecting corrosion. Referring to FIG. 3*c*, when the electrolyte comprising corrosive ions 34 is present (comprising cations and anions) the first corrosion inhibitor 30 acts by cations being sequestered by the cation exchange resin which releases protonated benzotriazole into the electrolyte where it is deprotonated (this will moderate the under film pH) and will eventually turn into its anionic form at pH's above 7.2. Another beneficial effect is when the benzotriazole is in a neutral form a barrier layer can form on the metallic surface. The azole group at one end forms a bond with the metallic surface and also metallic ions released resulting from the anodic dissolution. The adsorbed benzotriazole is thought to stifle electron transfer reactions while the precipitate 36 formed by reaction of benzotriazole anions with metal cations forms an inhibitive film which blocks the surface to further corrosive attack. This response is very fast, minimising the corrosion progression.

In addition to the response of the first corrosion inhibitor 30, under these conditions of aqueous environment, phosphate anions dissolve out of the phosphate salt, which then react with remaining metal cations to form a precipitate of metal phosphate 40. The combined precipitate formed from the first and second corrosion inhibitors provides a strong protective layer to prevent further corrosion. Accordingly, as shown in more detail in FIG. 3*e*, there is quick exchange of corrosion ions into the ion exchange resin, releasing in a preferred embodiment benzotriazolate (BTA) rapidly to form a film over the metal surface and complexing with any dissolved metal ions 42. The phosphate then has enough time to dissolve into the electrolyte. Effective protection is therefore not dependent on enough concentration of phosphate anions appearing quickly to form a protective layer, rather the phosphate anions a slower to appear but when they do react with the metal cations to ensure formation of a continuous film and fill in between any gaps in the BTA. Layers and layers are built up of the combination of the two precipitates.

The coating as described may be used in a multi-layer system on coated Hot Dip Galvanised (HDG) Steel, to protect from under-film corrosion. It may also be used on steel without galvanisation to protect from corrosion.

In each of the following examples, the first corrosion inhibitor comprises benzotriazole cation in a divinylbenzene copolymer with a negatively charged sulphonated functional group cation exchange resin.

Figure 4:
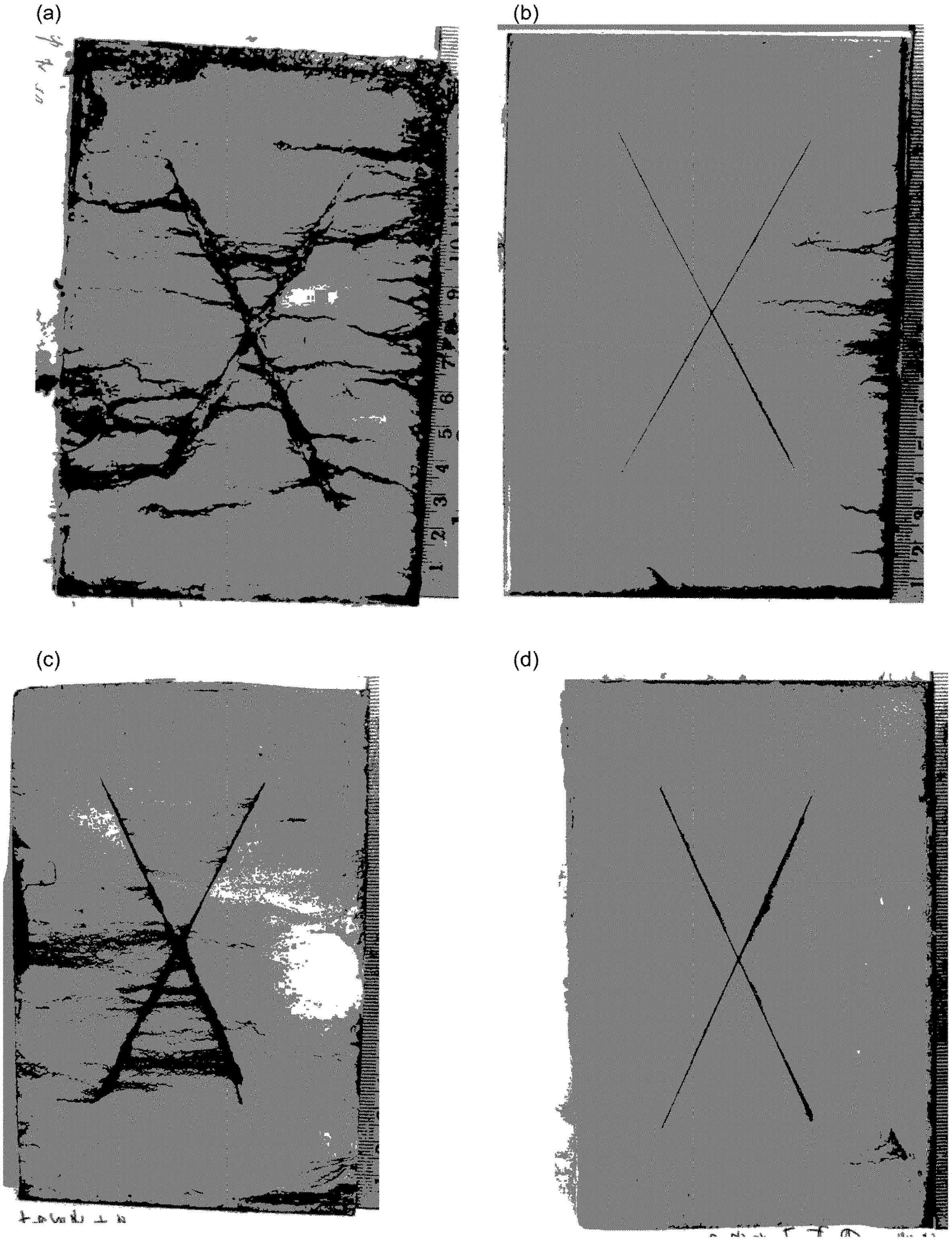
FIG. 4 are images of corrosion after 1000 hours under ASTM B117 salt spray on steel panels comparing the corrosive effect of the coatings with a polymer binder carrying zinc phosphate with the same coatings but including a corrosion inhibitor comprising an organic cation in a cation exchange resin.
Figure 4:
Figure 4:
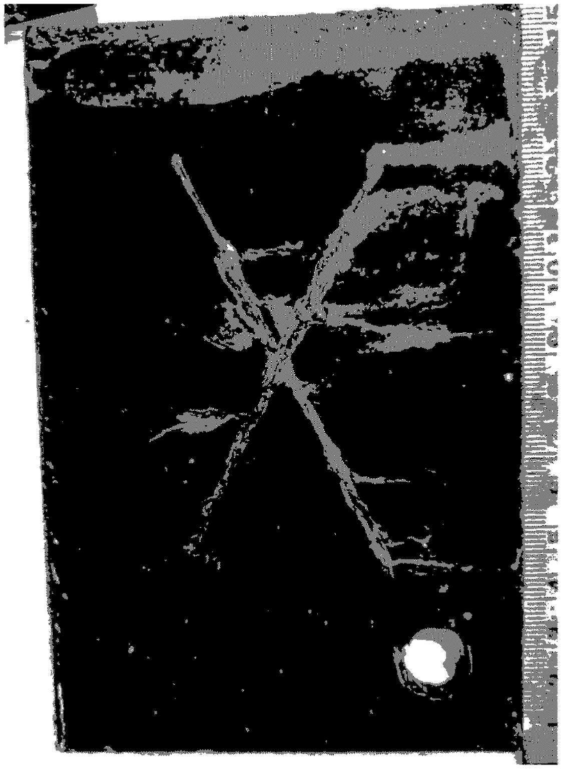
Figure 4:

FIGS. 4*a* and 4*b* are comparative photographs of the same steel panels following 1000 hours in a corrosive environment comparing in FIG. 4*a* the steel panel coated with a commercially available two pack epoxy primer having a composition including 3 weight percent zinc phosphate. It will be appreciated that for each panel a cross has been scored through the coating and into the panel in accordance with standard corrosion testing procedure. This is compared to FIG. 4*b* which shows the same steel substrate coated with the same two pack epoxy primer with the addition of 5 weight percent of a first corrosion inhibitor in particulate form comprising an organic cation in a cation exchange resin (benzotriazole cation in a divinylbenzene copolymer with a negatively charged sulphonated functional group cation exchange resin. The significant reduction in corrosion presented in FIG. 4*b* is readily apparent.

FIG. 4*c* is an alternative industrially available two pack epoxy primer having 3 weight percent zinc phosphate therein where FIG. 4*c* shows the extent of corrosion following 1000 hours. In comparison, FIGS. 34 and 4*e* show the incorporation in the same two pack epoxy primer of 5 percent and 1 percent of a first corrosion inhibitor comprising an organic cation in a cation exchange resin respectively. It is apparent that the inclusion of the first corrosion inhibitor has a significant effect upon the reduction in visible corrosion.

FIGS. 4*f* and 4*g* show the same steel panel with a comparison of utilisation of a two pack epoxy and top coat including 3 weight percent of zinc phosphate in FIG. 4*f* and in FIG. 4*g* showing the same two pack epoxy and top coat including the same weight percentage of zinc phosphate together with an additional 5 weight percent of a first corrosion inhibitor comprising an organic cation in a cation exchange resin. The reduction in corrosion with the combination of zinc phosphate and the first corrosion inhibitor as presented in FIG. 4*g* is readily apparent.

Figure 5:
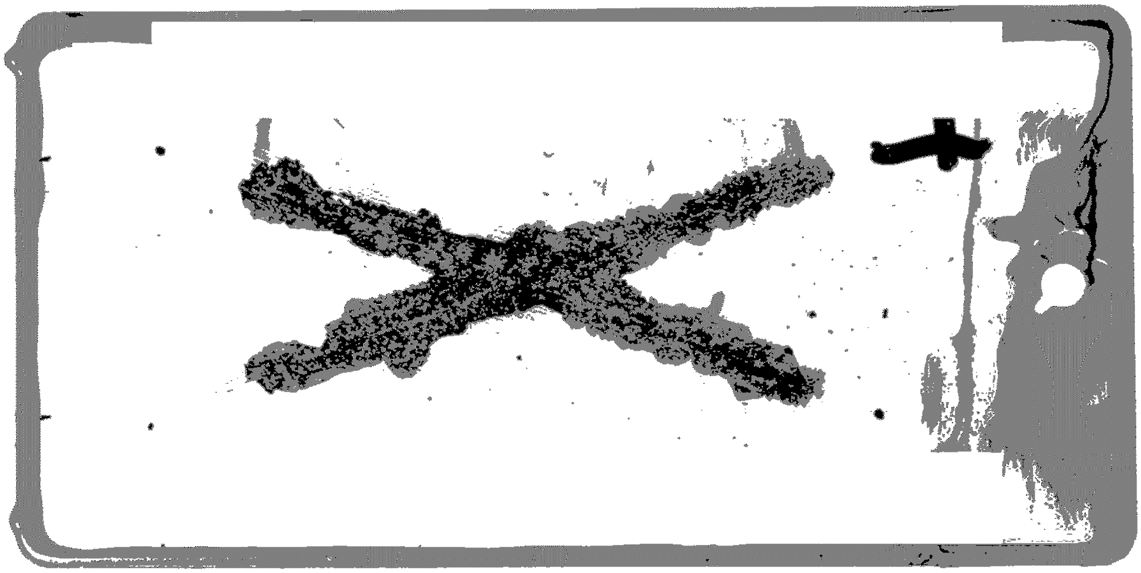
FIGS. 5*a* and 5*b* are images showing a comparison of corrosion for identical steel panels under test conditions of 250 hours under ASTM B117 salt spray where the panel in FIG. 4*a* is coated with a commercially available manufactured single layer direct to metal (DTM) primer including a first corrosion inhibitor and the panel in FIG. 4*b* is coated with a commercially available single layer DTM primer containing only zinc phosphate.
Figure 5:
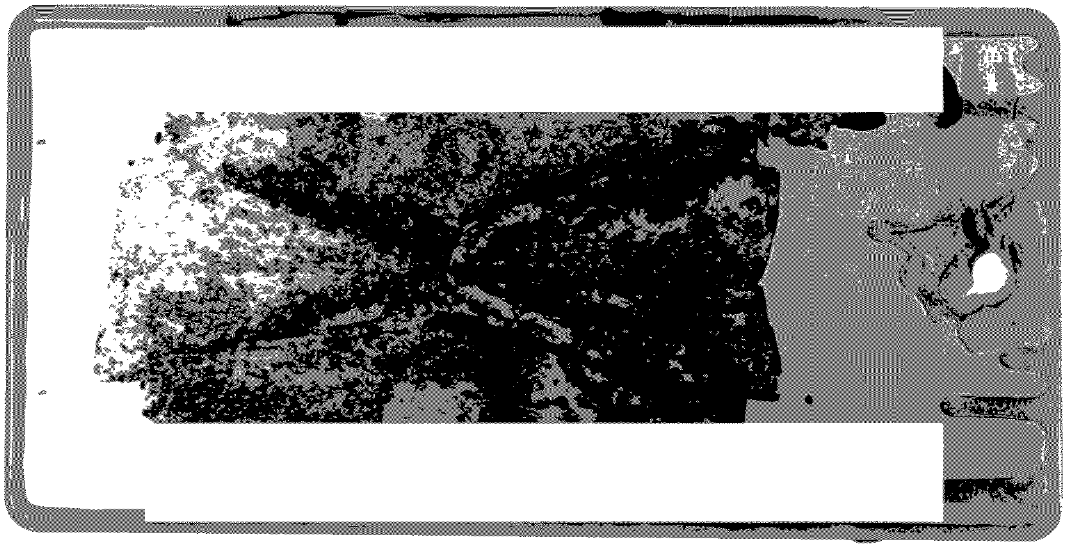

FIGS. 5*a* and 5*b* show identical steel panels (where the panel in FIG. 5*a* is coated with a commercially available single layer direct to metal (DTM) primer including 5% loading of the first corrosion inhibitor. The panel in FIG. 4*b* is coated with a commercially available single layer DTM primer containing only zinc phosphate of 25%. For each panel the primer was not coated with a topcoat. Following testing under standard ASTM B117 salt spray testing conditions the bond between the coating and metal has been significantly weakened leading to delamination. In each test gentle mechanical action on the coating led to differing extent of delamination. It is readily apparent that the panel containing only zinc phosphate as presented in FIG. 5*b* underwent significant delamination of the primer from the panel due to corrosion of the panel affecting the ability of the coating to adhere to the panel. Conversely however, the panel as presented in FIG. 5*a* where the primer contains the first corrosion inhibitor only there is some delamination however requires mechanical force to remove the coating showing an improvement of the first corrosion inhibitor over a primer containing zinc phosphate. Importantly this effect is apparent in a commercially available DTM primer.

FIGS. 6*a* and *b* are schematic representations of a standard corrosion test known as a Scanning Kelvin Probe (SKP) delamination test. In this test, a metal substrate 2 is provided and a test area 4 is defined between an adhesive tape 6 and insulating tape guide 8. A protective coating 10 for testing is spread across the test area 4 using a coating bar 12 thereby covering the test area as shown in FIG. 6*b*. An adhesive tape/coating barrier 14 is provided to define an electrolyte well 16 and a corrosion site 18 is therefore provided at the interface of the electrolyte and the test area 4. A scanning kelvin tip probe 20 can be used to monitor corrosion in real time. The action of the electrolyte on the interface between the coating and underlying metal causes cathodic disbondment failure which results in the destruction of the bond between the underlying metal and the coating. As the corrosion establishes and progresses, the cathodic disbondment front moves along the test piece.

Figure 6:
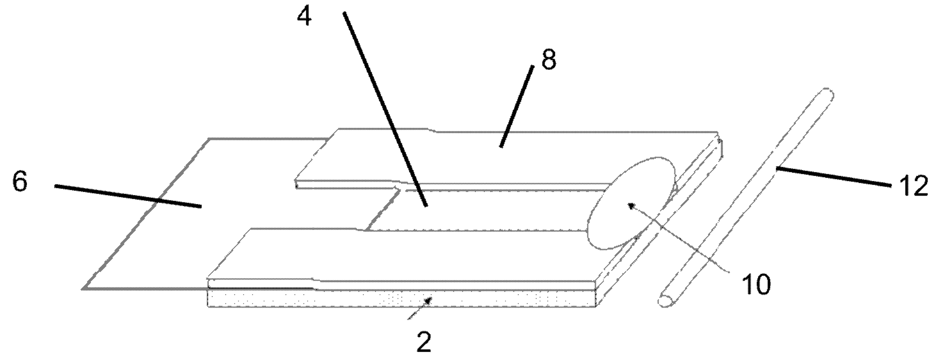
FIGS. 6*a* and *b* are schematic representations of a standard corrosion test known as a Scanning Kelvin Probe (SKP) delamination test.
Figure 6:
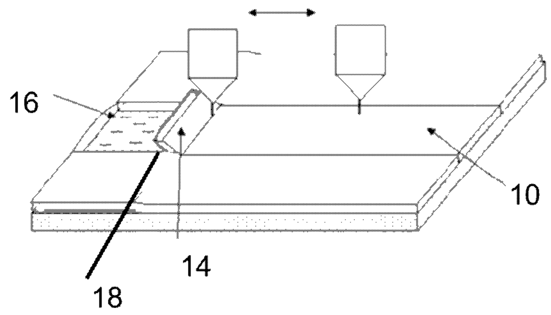

Referring to FIGS. 7*a* and *b*, the effect of delamination upon a test coating comprising polyvinyl butyral in ethanol (of 15.5 weight %) containing zinc phosphate in FIG. 7*a* and containing the first corrosion inhibitor in FIG. 7*b* is presented using the testing apparatus as shown in FIG. 6. The location of the electrolyte well 16 is shown. The coating as presented in FIG. 7*b* does not contain any zinc phosphate. The effect of delamination can clearly be viewed where both test pieces underwent complete delamination. This compares to the test results of FIG. 5 where delamination was decreased (but not prevented) in a commercially available coating rather than a simple test coating.

Figure 7:
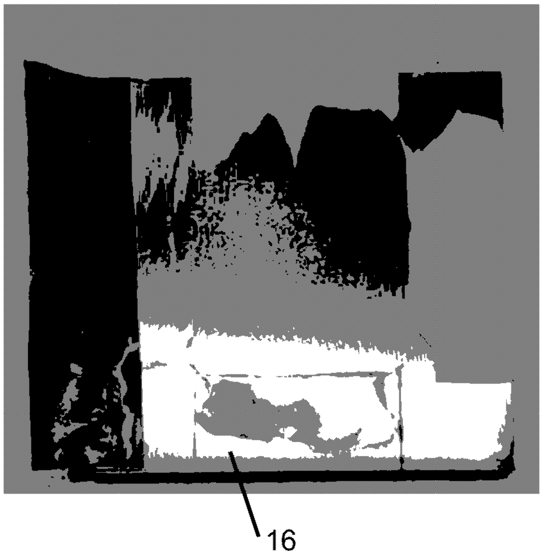
FIGS. 7*a* and *b* are images showing the effect of delamination upon a non-commercial test coating comprising polyvinyl butyral in ethanol (of 15.5 weight %) containing zinc phosphate in FIG. 6*a* and containing a first corrosion inhibitor in FIG. 6*b* using the testing apparatus as shown in FIG. 5.
Figure 7:
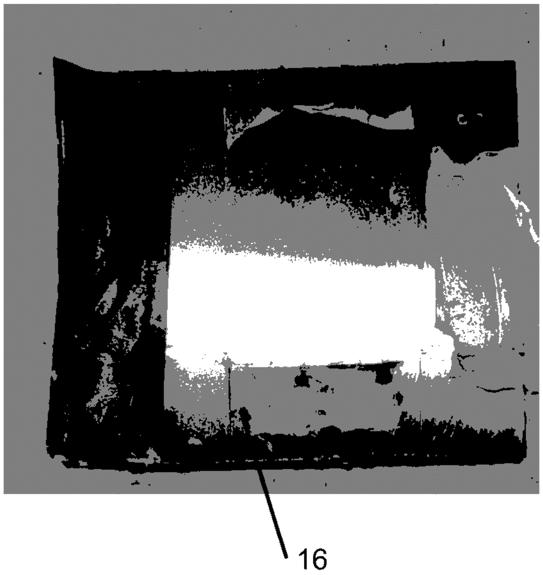
Figure 8:
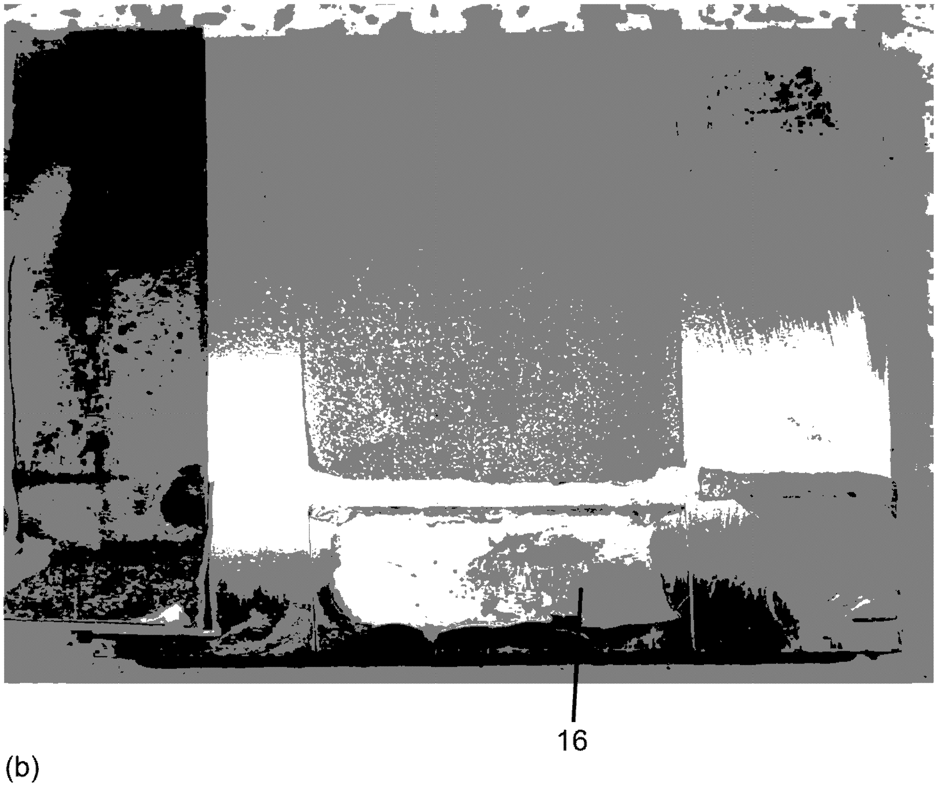
FIGS. 8*a* and *b* are images of corrosion of mild steel test pieces coated with a polyvinyl butyral in ethanol coating containing both a first corrosion inhibitor and zinc phosphate in different weight percentages.
Figure 8:
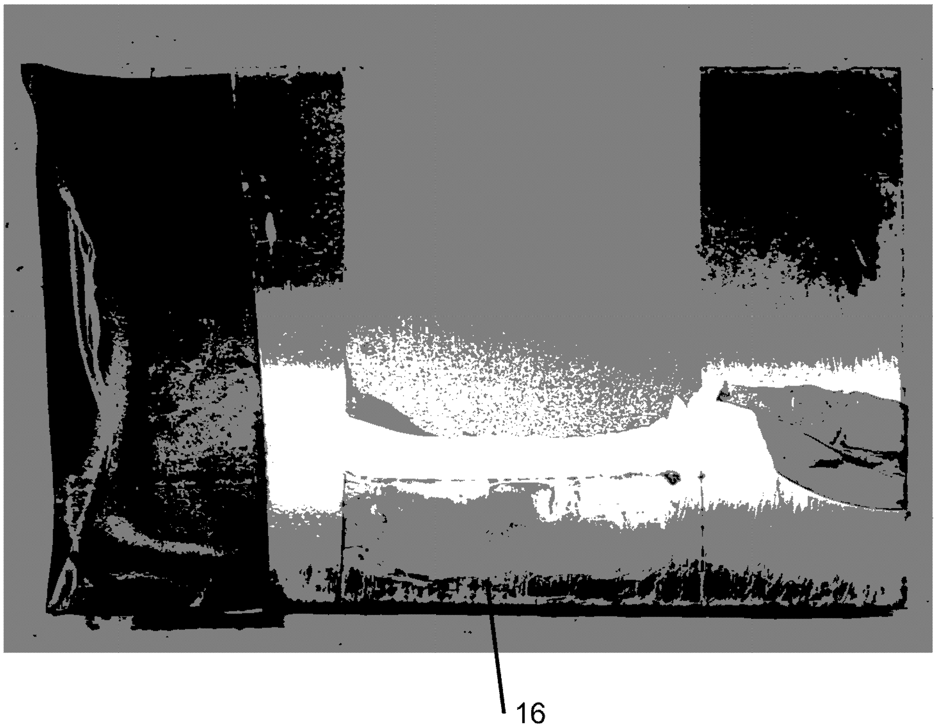

A direct comparison of the results presented in FIG. 7 can be made with the results presented in FIG. 8, where mild steel test pieces were coated with a test coating comprising polyvinyl butyral in ethanol containing both the first corrosion inhibitor and zinc phosphate. The coating in FIG. 8*a* contains 8 weight percent first corrosion inhibitor and 5 weight percent zinc phosphate, and the coating of FIG. 8*b* contains 4 weight percent first corrosion inhibitor and 2.5 weight percent zinc phosphate. It is clear that the delamination effect is minimal. Thus, the synergistic effect of the first corrosion inhibitor and the metal phosphate on the reduction in corrosion is apparent.

Figure 9:
FIGS. 9*a* and *b* are images of corrosion of hot dip galvanised steel using the same coatings and weight percentages as used in the test results presented in FIGS. 7*a* and *b;*
Figure 9:
Figure 9:
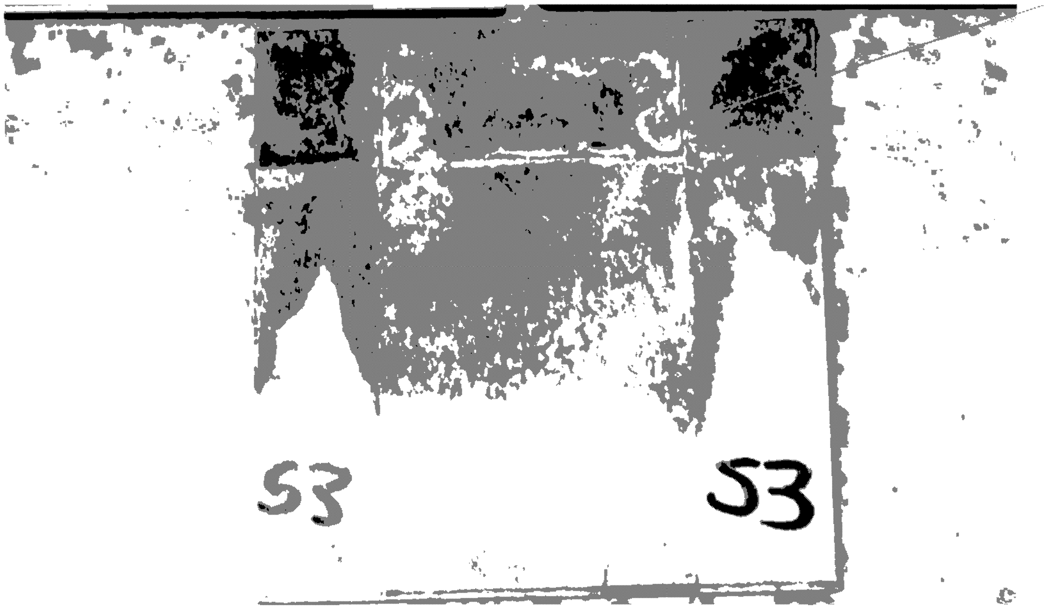

Referring to FIGS. 9*a* and *b*, presented are test results for hot dip galvanised steel using the same coatings and weight percentages as used in the test results presented in FIGS. 8*a* and *b*. Direct comparison is made to the same substrate in FIG. 9*c* which was coated with a coating without the first corrosion inhibitor, clearly showing complete delamination has occurred. FIGS. 9*a* and *b* show minor delamination effects. Again, the significant synergistic effect of utilising both first and second corrosion inhibitors as disclosed herein.

Figure 10:
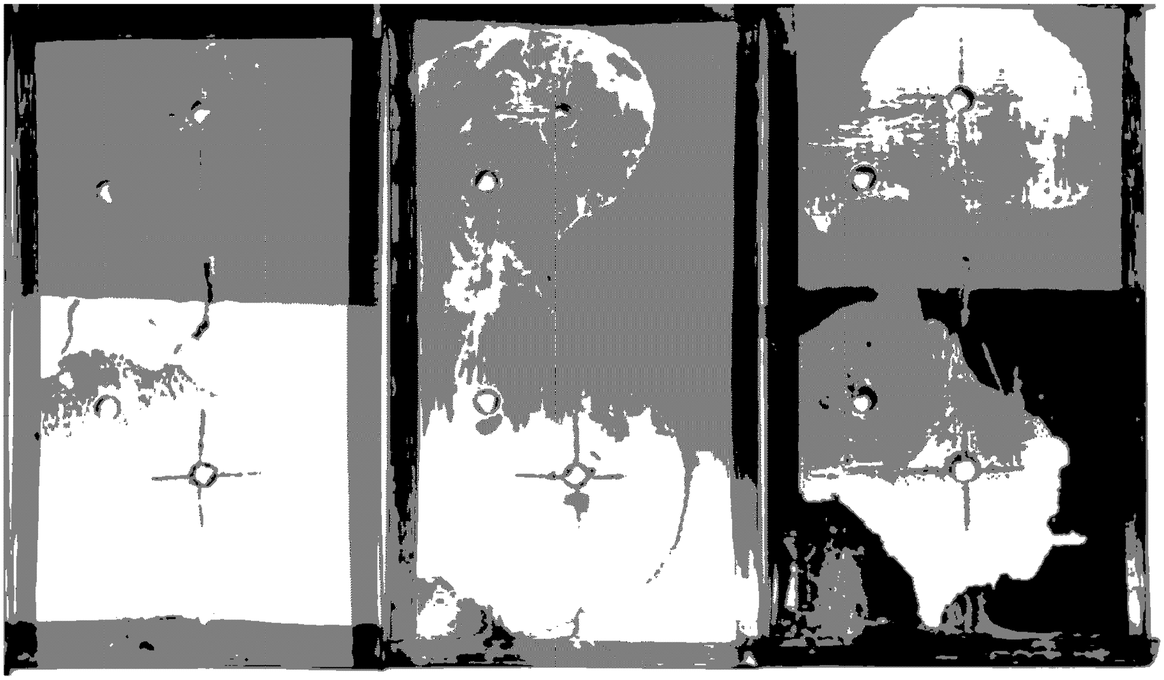
FIG. 10 is a visual comparison between 2024 T3 aerospace aluminium comparing a coating according to the present invention (a) versus two known commercially available chromated coatings (b) and (c)

FIG. 10 is a comparison between 2024 T3 aerospace aluminium comparing a coating according to the present invention (a) versus two known commercially available chromated coatings (b) and (c). The coating tested in FIG. 10*a* is a coating according to the present invention comprising 5 PVC first corrosion inhibitor and 20 PVC second corrosion inhibitor in a polymer binder and shows delamination after testing according to a Scanning Kelvin Probe (SKP) delamination test. It is clear that the present invention strongly outperforms traditional chromate-based coatings.

Figure 11:
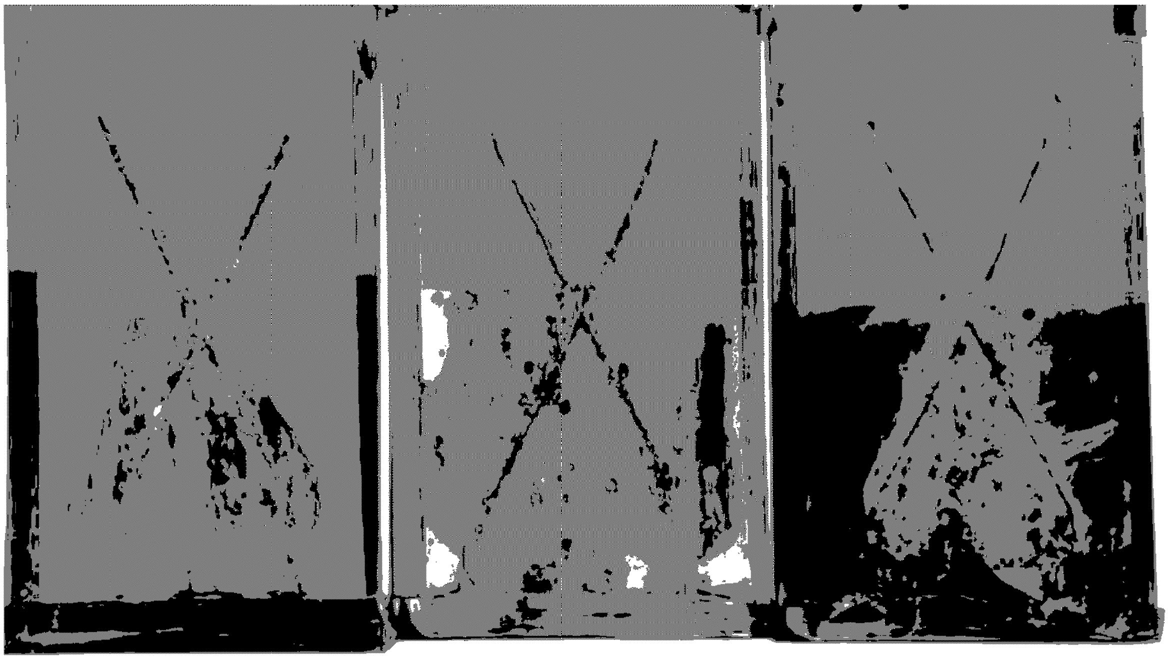
FIG. 11 is a visual comparison of the same coatings on cold rolled steel as presented in FIG. 10.

FIG. 11 is a visual comparison of the same coatings and order of presentation on cold rolled steel as presented in FIG. 10. Again, the effectiveness of an illustrative embodiment of the present invention is clearly visually presented.

The present invention has been described by way of example only and it will be appreciated by the skilled addressee that modifications and variations may be made without departing from the scope of protection disclosed herein.

The invention claimed is:

1. A corrosion inhibiting additive comprising:

a first corrosion inhibitor comprising benzotriazolate in a cation exchange resin, wherein the cation exchange resin is a styrene divinylbenzene copolymer; and a second corrosion inhibitor comprising one or more metal phosphates, wherein the weight ratio of the first corrosion inhibitor to the second corrosion inhibitor is between 1:3 and 3:2.

2. The corrosion inhibiting additive according to claim 1, wherein the phosphate compound comprises a metal polyphosphate compound.

3. The corrosion inhibiting additive according to claim 1, wherein the one or more metal phosphates comprises zinc phosphate.

4. The corrosion inhibiting additive according to claim 1, wherein the first and second corrosion inhibitor are particulate.

5. A coating for a metal substrate, the coating comprising:

the corrosion inhibiting additive according to claim 1;

wherein the first and second corrosion inhibitors are provided in a polymer binder.

6. The coating according to claim 5, wherein the combined first and second corrosion inhibitor comprise between 4 and 30 weight percent of a coating weight in wet form.

7. The coating according to claim 6, wherein the combined first and second corrosion inhibitor comprises between 5 and 20 weight percent of the coating weight in wet form.

8. The coating according to claim 5, wherein the polymer is liquid at room temperature and pressure.

9. The coating according to claim 5, wherein the polymer binder is selected from one or more of an acrylic, polyester, epoxy, silicone, alkyd polyurethane or polyvinyl butyral.

10. A method of protecting a metal substrate, the method comprising applying the coating according to claim 5 to the metal substrate.

11. The corrosion inhibiting additive according to claim 1, wherein the one or more metal phosphates comprises zinc phosphate, a metal polyphosphate compound selected from the group consisting of strontium polyphosphate, calcium polyphosphate, magnesium polyphosphate, aluminum polyphosphate, and combinations thereof, or both.

12. The corrosion inhibiting additive according to claim 1, wherein the weight ratio of the first corrosion inhibitor to the second corrosion inhibitor is 3:2.

* * * * *